Sept. 15, 1931.  E. PESKAR  1,823,626
HYDRAULIC FRICTION DEVICE FOR HOISTING MACHINES
Filed Oct. 30, 1929
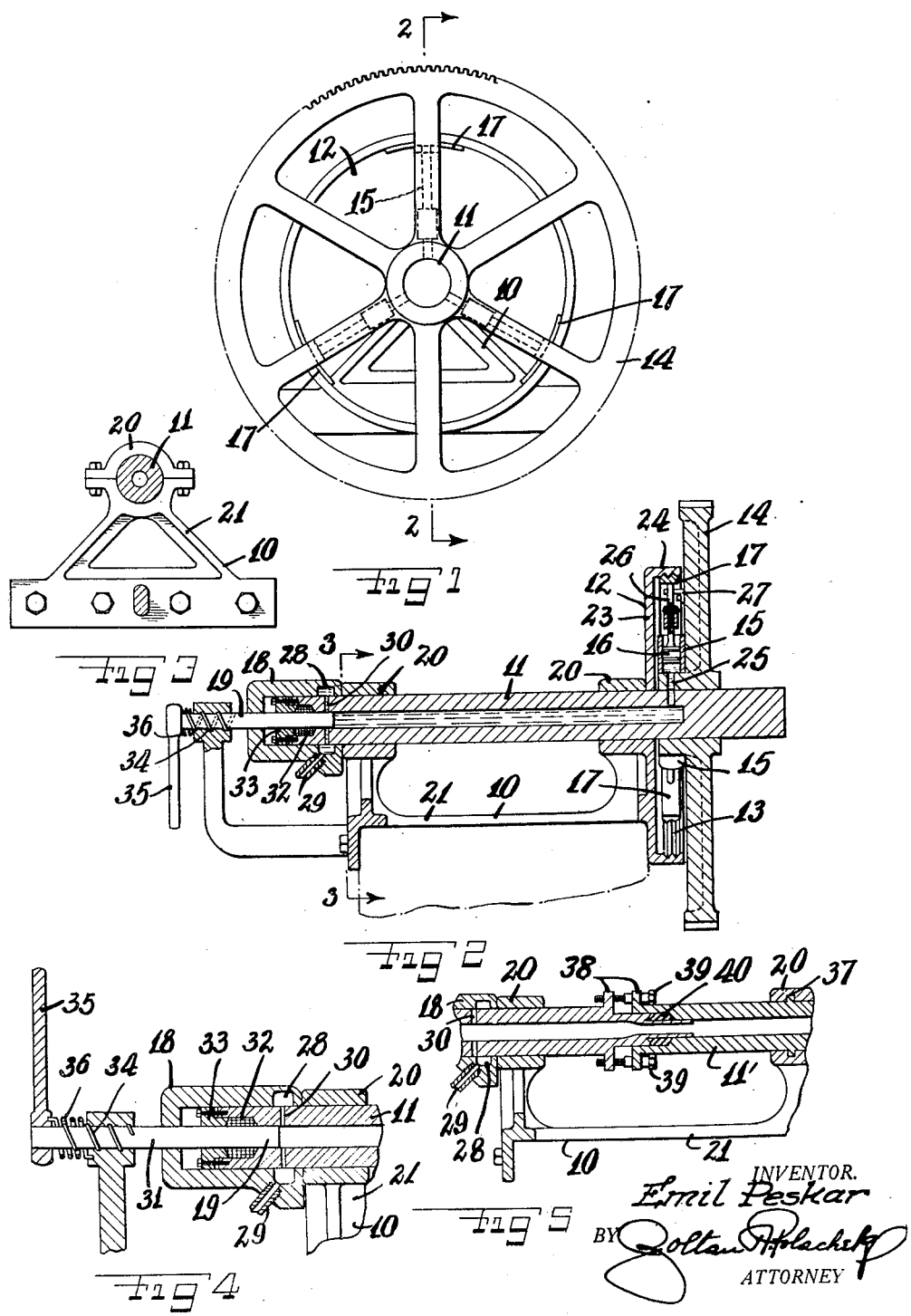
INVENTOR.
Emil Peskar
BY Zoltan Holacsek
ATTORNEY Patented Sept. 15, 1931

1,823,626

UNITED STATES PATENT OFFICE

EMIL PESKAR, OF NEW YORK, N. Y.

HYDRAULIC FRICTION DEVICE FOR HOISTING MACHINES

Application filed October 30, 1929. Serial No. 403,648.

This invention relates to new and useful improvements in a hydraulic friction device for hoisting machines.

The invention has for an object the provision of a device of the class mentioned which is of simple durable construction, dependable in use and efficient in action, and which can be manufactured and sold at a reasonable cost.

It is general to provide friction devices for hoisting machines. A device hydraulically operated as contemplated by this invention is very positive and safe in use. Furthermore, an unlimited strength of frictioning may be developed as is desired at any particular moment.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:—

Fig. 1 is an end elevational view of a device constructed according to this invention.

Fig. 2 is a longitudinal sectional view taken on the line 2—2 of Fig. 1.

Fig. 3 is a fragmentary transverse sectional view taken on the line 3—3 of Fig. 2.

Fig. 4 is an enlarged detailed view of a portion of Fig. 2.

Fig. 5 is a fragmentary view similar to a portion of Fig. 2 but illustrating another embodiment.

The hydraulic friction device for hoisting machines consists of a frame member 10 rotatively supporting a hollow shaft 11, a drum 12 fixed upon the frame member and having an internal friction surface 13, a gear 14 for connection with a hoisting machine and fixed on said shaft 11 adjacent said drum 12, a plurality of hydraulic cylinders 15 fixed on the gear 14 and having pistons 16 supporting friction shoes 17 engageable with said friction surface 13 and hydraulically connected with the hollow of said shaft 11, a fluid pressure medium supply chamber 18 connected for discharging into the hollow shaft 11, and a manually operated plunger valve 19 within the hollow of the shaft 11 and capable of cutting the fluid pressure medium supply from the supply chamber and to increase the pressure of the entrapped fluid pressure medium for forcing the brake shoes against the friction surface.

The frame member 10 is provided with spaced bearings 20 connected by a web 21. The bottom of the web is flat for attachment upon a platform as indicated by the dot and dash lines 22. The shaft 11 is supported upon the bearings 20 for constituting the rotative supporting. The hollow of the shaft 11 consists of a bore extending inwards from one end and terminating slightly before the other end.

The drum 12 is arranged transversely of the shaft 11 and consists of a plate portion 23 and a lateral overhanging flange 24. The friction surface 13 is arranged within the flange 24 and consists of adjacent V shaped circular grooves. As shown on the drawings, three brake shoes 17 are provided though it should be understood that any number may be designed to work satisfactorily. These brake shoes are equally spaced from each other. The cylinders 15 are connected with the bore of the shaft 11 by radial passages 25. These passages connect the inner ends of the cylinders with the bore. The pistons 16 connect with the connecting rods 26 which are slidably supported on guide brackets 27 mounted upon the gear 14. The brake shoes 17 are attached upon the outer ends of the guide rods.

The fluid pressure medium supply chamber 18 is attached upon the frame member 10 and is provided with a circular recess 28 arranged about the shaft 11 and constituting the liquid supply chamber. A supply pipe or reservoir 29 connects with this chamber and is intended to connect with fluid pressure medium supplied under pressure. The shaft 11 is provided with a plurality of radial apertures 30 aligned with the circular recess 28 for receiving the fluid pressure medium. The plunger valve 19 consists of a rod 31 having its inner end engaged in the bore of the shaft 11 and terminating slightly before the radial apertures 30. Packing material 32 encircles the rod and is forced into tight contact by a packing gland 33 mounted on the end of the shaft 11.

The central portion of the rod 31 is provided with threads 34 threadedly engaging in the member 18. A handle 35 is fixed upon the outer end. A coaxial spring 36 is arranged upon the rod 31 between the handle 35 and the member 18 and normally acts to hold the handle 35 in a certain rotative position. More specifically, the handle may be rotated for turning the rod 31 inwards and upon being released the spring 36 acts to turn it back into its original position.

In the embodiment illustrated in Fig. 5, a means has been shown for controlling the passage of the fluid pressure medium from the supply chamber to the bore of the shaft for adjustment of the agility of the friction device. This means consists of a hollow shaft 11' formed of two sections, one of these sections having a thrust collar 37 so as to be rotatively mounted in its bearing and be held against longitudinal movements, and both of these sections are provided with adjacent flanges 38.

Adjustment screws 39 threadedly engage these flanges and are provided with opposite hand thread portions so that upon rotation of the screws the flanges are either separated or drawn together. The sections of the shaft are arranged in telescopic fashion, and are provided with rubber packing 40 so that the fluid pressure medium may pass thru the shaft and not leak between the sections. The screws 39 may be rotated for adjusting the position of the radial passages 30 relative to the circular recess 28 and so control the size of the passage thru which the fluid pressure medium may pass.

In operation of the device, a fluid pressure medium under a constant pressure is supplied from the pipe 29 and normally urges the friction shoes 17 with a slight pressure against the friction surface of the drum. If the operator wants to increase the pressure materially, he rotates the handle 35 so that the rod 31 moves inwards and cuts off the supply of the fluid pressure medium thru the passages 30 and compresses the entrapped fluid pressure medium to any desired pressure for producing the proper frictioning. The pressure of the fluid pressure medium in pipe 29 continues but acts ineffectively against the rod 31.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A hydraulic friction device for hoisting machines, comprising a frame member rotatively supporting a hollow shaft, a drum fixed on the frame member and having an internal friction surface, a gear fixed on said shaft adjacent said drum, a plurality of hydraulic cylinders fixed on the gear and having pistons supporting friction shoes engageable with said friction surface and hydraulically connected with the hollow of said shaft, a fluid pressure medium supply chamber connected for discharging into the hollow shaft, and a manually operated plunger valve within the hollow of the shaft and capable of cutting the fluid pressure medium supply from the supply chamber and to increase the pressure of the entrapped fluid pressure medium for forcing the brake shoes against the friction surface.

2. A hydraulic friction device for hoisting machines, comprising a frame member rotatively supporting a hollow shaft, a drum fixed on the frame member and having an internal friction surface, a gear fixed on said shaft adjacent said drum, a plurality of hydraulic cylinders fixed on the gear and having pistons supporting friction shoes engageable with said friction surface and hydraulically connected with the hollow of said shaft, a fluid pressure medium supply chamber connected for discharging into the hollow shaft, and a manually operated plunger valve within the hollow of the shaft and capable of cutting the fluid pressure medium supply from the supply chamber and to increase the pressure of the entrapped fluid pressure medium for forcing the brake shoes against the friction surface, said frame having spaced bearings connected by a web arranged for attachment upon a platform and the bearings constituting the rotative supporting of the hollow shaft.

3. A hydraulic friction device for hoisting machines, comprising a frame member rotatively supporting a hollow shaft, a drum fixed on the frame member and having an internal friction surface, a gear fixed on said shaft adjacent said drum, a plurality of fluid pressure medium cylinders fixed on the gear and having pistons supporting friction shoes engageable with said friction surface and hydraulically connected with the hollow of said shaft, a fluid pressure medium supply chamber connected for discharging into the hollow shaft, and a manually operated plunger valve within the hollow of the shaft and capable of cutting the fluid pressure medium supply from the supply chamber and to increase the pressure of the entrapped fluid pressure medium for forcing the brake shoes against the friction surface, said hollow shaft having a bore extended inwards from one end and terminating slightly before the other end and the plunger valve being mounted within the opened end of the shaft.

4. A hydraulic friction device for hoisting machines, comprising a frame member rotatively supporting a hollow shaft, a drum fixed on the frame member and having an internal friction surface, a gear fixed on said shaft adjacent said drum, a plurality of fluid pressure medium cylinders fixed on the gear and having pistons supporting friction shoes engageable with said friction surface and hydraulically connected with the hollow of said shaft, a fluid pressure medium supply chamber connected for discharging into the hollow shaft, and a manually operated plunger valve within the hollow of the shaft and capable of cutting the fluid pressure medium supply from the supply chamber and to increase the pressure of the entrapped fluid pressure medium for forcing the brake shoes against the friction surface, the drum consisting of a plate portion and a lateral overhanging flange with an internal surface provided with V shaped circular grooves constituting the said internal friction surface.

5. A hydraulic friction device for hoisting machines, comprising a frame member rotatively supporting a hollow shaft, a drum fixed on the frame member and having an internal friction surface, a gear fixed on said shaft adjacent said drum, a plurality of fluid pressure medium cylinders fixed on the gear and having pistons supporting friction shoes engageable with said friction surface and a hydraulic connection connecting said cylinders with the hollow of said shaft, a fluid pressure medium supply chamber connected for discharging into the hollow shaft, and a manually operated plunger valve within the hollow of the shaft and capable of cutting the fluid pressure medium supply from the supply chamber and to increase the pressure of the entrapped fluid pressure medium for forcing the brake shoes against the friction surface, the hydraulic connection between the cylinders and the hollow of the shaft being accomplished by radial passages.

6. A hydraulic friction device for hoisting machines, comprising a frame member rotatively supporting a hollow shaft, a drum fixed on the frame member and having an internal friction surface, a gear fixed on said shaft adjacent said drum, a plurality of fluid pressure medium cylinders fixed on the gear and having pistons supporting friction shoes engageable with said friction surface and a hydraulic connection connecting said cylinders with the hollow of said shaft, a fluid pressure medium supply chamber connected for discharging into the hollow shaft, and a manually operated plunger valve within the hollow of the shaft and capable of cutting the fluid pressure medium supply from the supply chamber and to increase the pressure of the entrapped fluid pressure medium for forcing the brake shoes against the friction surface, the hydraulic connection between the cylinders and the hollow of the shaft being accomplished by radial passages, comprising a rod engaging within the bore of the shaft and terminating slightly before radial apertures in the shaft communicating with a circular recess about the shaft for holding the fluid pressure medium, a portion of said rod being provided with threads engaging in the hydraulic chamber member, a handle on the rod for its advancing, and a means for normally holding the rod in a neutral rotative position.

7. A hydraulic friction device for hoisting machines, comprising a frame member rotatively supporting a hollow shaft, a drum fixed on the frame member and having an internal friction surface, a gear fixed on said shaft adjacent said drum, a plurality of fluid pressure medium cylinders fixed on the gear and having pistons supporting friction shoes engageable with said friction surface and hydraulically connected with the hollow of said shaft, a fluid pressure medium supply chamber connected for discharging into the hollow shaft, and a manually operated plunger valve within the hollow of the shaft and capable of cutting the fluid pressure medium supply from the supply chamber and to increase the pressure of the entrapped fluid pressure medium for forcing the brake shoes against the friction surface, said hollow shaft being made of two sections adjustably connected for changing the position of radial passages in the shaft and communicating with a chamber supplying fluid pressure medium so as to vary the path of passages of the fluid pressure medium.

In testimony whereof I have affixed my signature.

EMIL PESKAR.